United States Patent [19]

Baldwin

[11] Patent Number: 5,534,948
[45] Date of Patent: Jul. 9, 1996

[54] METHOD AND APPARATUS FOR REDUCING THE EFFECT OF ALIAS COMPONENTS PRODUCED THROUGH NON-LINEAR DIGITAL SIGNAL PROCESSING, SUCH AS GAMMA CORRECTION, BY SELECTIVE ATTENUATION

[75] Inventor: John L. E. Baldwin, Eastleigh, United Kingdom

[73] Assignee: Rank Cintel Limited, United Kingdom

[21] Appl. No.: 334,761

[22] Filed: Nov. 4, 1994

Related U.S. Application Data

[63] Continuation of Ser. No. 195,567, Feb. 14, 1994, abandoned, which is a continuation of Ser. No. 834,578, filed as PCT/GB90/01278, Aug. 14, 1990 published as WO91/03122, Mar. 7, 1991, abandoned.

[30] Foreign Application Priority Data

Aug. 15, 1989 [GB] United Kingdom ............... 8918560

[51] Int. Cl.[6] ........................... H04N 9/69; H04N 5/202
[52] U.S. Cl. ................................. 348/675; 348/254
[58] Field of Search .................... ; 348/254–256, 348/674, 675; H04N 9/69, 5/202

[56] References Cited

U.S. PATENT DOCUMENTS

| | | | |
|---|---|---|---|
| 4,591,900 | 5/1986 | Heeb et al. | 358/44 |
| 4,827,342 | 5/1989 | Ohta et al. | 358/167 |
| 4,829,367 | 5/1989 | Dubois et al. | 358/12 |
| 4,833,527 | 5/1989 | Kondo | 358/12 |
| 4,984,068 | 1/1991 | Sugiyama et al. | 358/21 R |
| 4,999,702 | 3/1991 | Knierim et al. | 358/32 |

FOREIGN PATENT DOCUMENTS

| | | | |
|---|---|---|---|
| 0196664 | 11/1984 | Japan | 358/164 |
| 0202594 | 9/1986 | Japan | H04N 9/69 |

OTHER PUBLICATIONS

Patent Abstracts of Japan, vol. 13, No. 374 (E–808) (3722).
Patent Abstracts of Japan, vol. 11, No. 11 (E–470) (2458).

*Primary Examiner*—Victor R. Kostak
*Assistant Examiner*—John W. Miller
*Attorney, Agent, or Firm*—Ostrolenk, Faber, Gerb & Soffen

[57] ABSTRACT

In non-linear digital video processing, high frequency components resulting from the non-linearity may appear as spurious low frequencies due to mirror image spectral reflection in the sampling frequency fs. The non-linear circuit may be a gamma corrector (35). The effect of the alias components is reduced by the use of a modifier circuit (50) before the gamma corrector, and a corresponding equalizer circuit (52) after it. The modifier attenuates the high frequency signal components, especially in the region fs/4 to fs/2. The equalizer substantially reinstates the overall frequency response. Both modifier and equalizer may be transversal filters (FIGS. 5 to 8) which, more generally, may be one dimensional or two dimensional (FIGS. 9 and 10). The system is also particularly relevant to progressively scanned sources; including telecine.

20 Claims, 6 Drawing Sheets

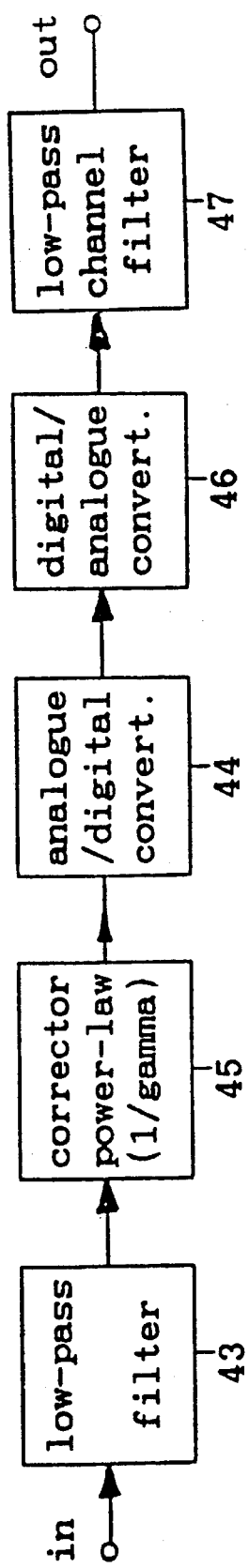
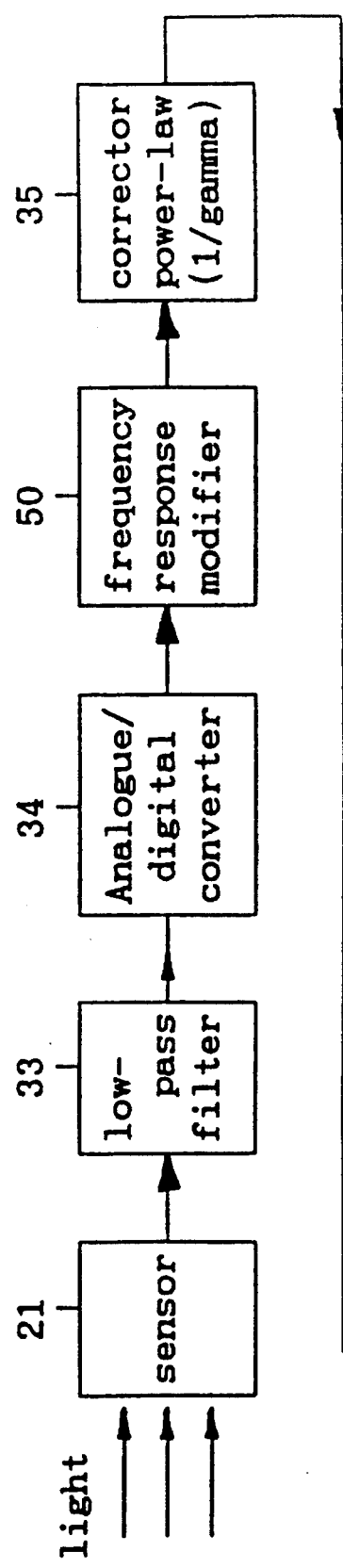
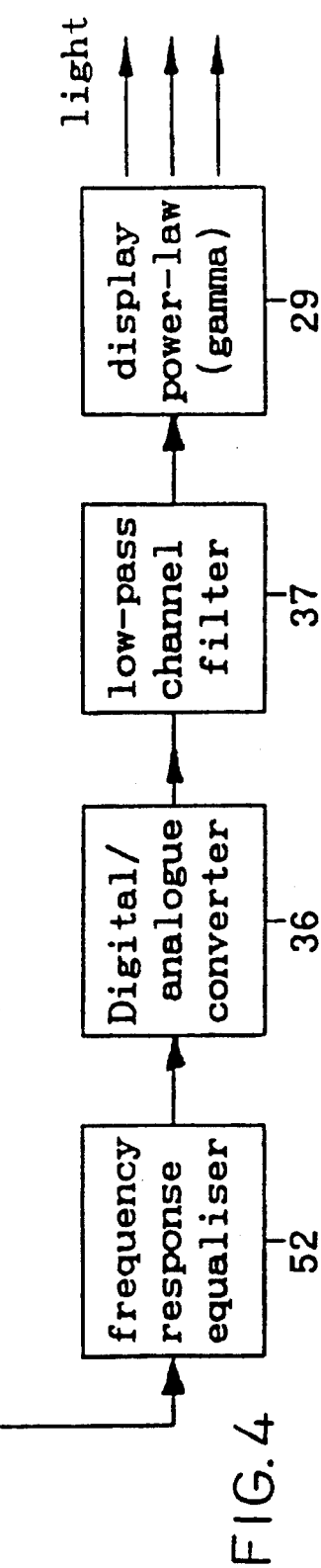
FIG. 3 PRIOR ART
FIG. 4

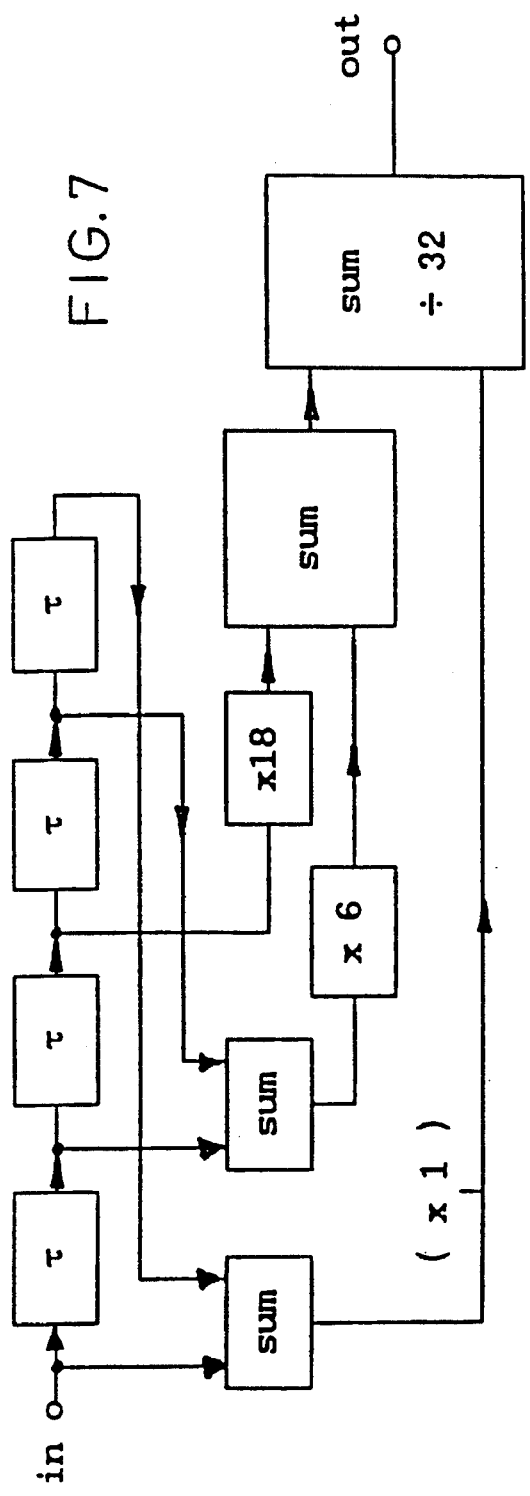
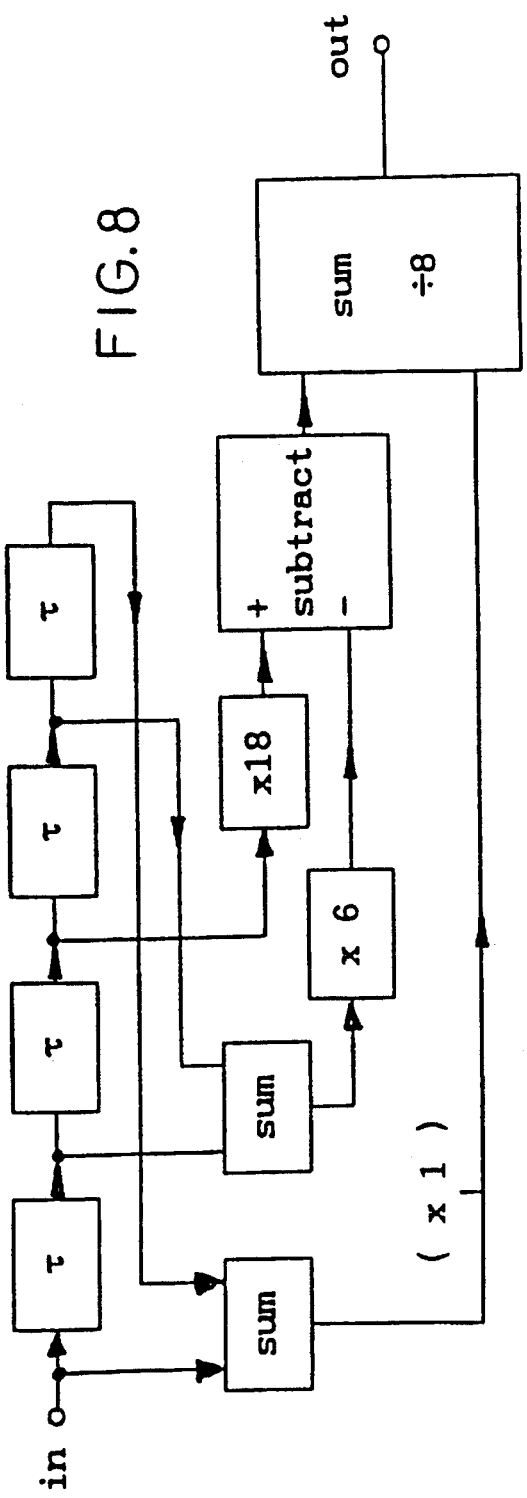

METHOD AND APPARATUS FOR REDUCING THE EFFECT OF ALIAS COMPONENTS PRODUCED THROUGH NON-LINEAR DIGITAL SIGNAL PROCESSING, SUCH AS GAMMA CORRECTION, BY SELECTIVE ATTENUATION

This is a continuation of application Ser. No. 08,195,567, filed Feb. 14, 1994, now abandoned, which is a continuation of application Ser. No. 07/834,578, filed as PCT/GB90/01278, Aug. 14, 1990 published as WO91/03122, Mar. 7, 1991, now abandoned.

BACKGROUND OF THE INVENTION

This invention relates to video signal processing where a signal in digitally-sampled form is subjected to a non-linear processing operation, and to reducing certain subjective impairments introduced by such processing.

FIG. 1 shows, in rudimentary form, those features of a normal analogue television system that provide a helpful introduction to understand the environment of this invention.

The light from a scene is imaged onto a sensor 21 where it is scanned. The electrical signal from this sensor is low-pass filtered in a filter 23 and passes to a gamma corrector 25, the purpose of which will be described later. The gamma-corrected signal is then low-pass filtered in a channel filter 27 to restrict the bandwidth to that available in the transmission channel. The signal received from the channel passes to a display 29 where it is converted back to an optical image of the original scene.

The transfer characteristics between the electrical signal into a cathode ray tube such as used in the display 29 and the light given out by the tube are far from linear. Indeed when the operating conditions have been set correctly the light output is closely proportional to the input when it has been raised to a constant power, or index. This power-law constant is called the gamma of the display tube. Historically, it used to be about 2.2 but current colour displays have a gamma that is higher, typically in the range 2.4 to 2.8. This spread of gamma is due to variations between different types of display tube although for each type it is substantially constant.

Although in many ways it would be better if the display tube were linear, i.e. gamma equal to 1, the non-linearity is useful in one most important respect, in that it causes channel noise to be more or less equally disturbing in all shades of grey between black and white. If the tube were linear the effect of channel noise in the darker areas would be very much worse.

If no correction were introduced for the effects of display gamma, the details in the shadow areas would be very much suppressed and the effect on colour would be equally severe. Although the corrector in theory should have a power of 1/gamma to achieve the same contrast ratio on the display as occurred in the scene, experience shows that the displayed pictures look better if the contrast ratio displayed is somewhat higher than that of the original scene. If the product of the powers of the gamma corrector and the display gammas is about 1.2, this seems to be about optimum, causing a preferred increase of displayed contrast and colour saturation.

In a telecine the film being scanned may also have an increased contrast or gamma and in this case the gamma correction will be required not only for the display but also for the characteristics of the film.

The gamma correction is a non-linear operation and thus produces harmonics, but it is found that the removal of these by the channel filter 27 is rarely noticeable, although it is undesirable from theoretical considerations.

FIG. 2 shows how part of the previous figure is changed when digital gamma correction is used. The boxes 33, 35 and 37 perform essentially the same function as boxes 23, 25 and 27, respectively, in the case of the analogue gamma correction in the circuit of FIG. 1. However, the cut-off rate of the filters may need to be slightly sharper for the digital implementation and of course the gamma correction itself is realised digitally, most simply by using the video as the address to interrogate a Read Only Memory (ROM) which has been suitably programmed. Two new boxes have been introduced, an analogue-to-digital converter 34 between the low pass filter 33 and the gamma corrector 35, and a digital-to-analogue converter 36 between the gamma corrector 35 and the channel filter 37.

The normal Nyquist requirement is to sample at a frequency which is greater than twice the highest possible signal frequency. For example, if the desired response requires that the filters 33 and 37 be flat to 5.5 MHz and if they also cut-off rapidly, being 12 or more decibels down at 6.75 MHz, this would be suitable for the normal case of a sampling frequency of 13.5 MHz. Since there are two filters, a 12 dB attenuation at half the sampling frequency per filter will, with typical filters, result in the alias components being attenuated by at least twice this amount, or 24 dB. However, the situation is not normal, as gamma correction is not a linear operation. The law of the gamma correction is required to be the same for analogue and digital realisations so the digital words at the output of the corrector 35 in FIG. 2, would be identical to those which would appear at the output of A/D converter 44 in FIG. 3. In FIG. 3 the positions of the A/D converter and the gamma corrector are interchanged, so that the gamma corrector is operating with analogue signals. By this means it is possible to compute the possible alias effects which can arise with the circuit of FIG. 2. The unit part of the box numbers in FIGS. 2 and 3 are the same for the same type of box, the numbers being increased by ten.

The level of alias effects will depend on the amplitude of the harmonics produced by the non-linearity of the gamma correction and on their frequency. In Table 1 it is assumed that the maximum peak-to-peak (p-p) amplitude of the signal is 1. The left hand column gives the peak-to-peak amplitude of a sine wave superimposed on a direct component of 0.5v. To the right, successive columns show the direct component, and the peak amplitudes of the fundamental and of each of the second, third and fourth harmonics appearing at the output of the gamma corrector. The table assumes a correction gamma value of 0.4, corresponding to a display gamma of 2.5.

TABLE 1

| Input p–p | Direct cpt. | Fundamental | 2nd harm. | 3rd harm. | 4th harm. |
|---|---|---|---|---|---|
| 1.000 | 0.6795 | 0.3883 | −0.0971 | 0.0457 | −0.0270 |
| 0.875 | 0.7113 | 0.3032 | −0.0516 | 0.0159 | −0.0060 |
| 0.750 | 0.7271 | 0.2477 | −0.0329 | 0.0078 | −0.0023 |
| 0.625 | 0.7379 | 0.2001 | −0.0208 | 0.0039 | −0.0009 |
| 0.500 | 0.7457 | 0.1566 | −0.0125 | 0.0018 | −0.0003 |
| 0.375 | 0.7512 | 0.1157 | −0.0067 | 0.0007 | −0.0001 |

TABLE 1-continued

| Input p-p | Direct cpt. | Fundamental | 2nd harm. | 3rd harm. | 4th harm. |
| --- | --- | --- | --- | --- | --- |
| 0.250 | 0.7550 | 0.0764 | −0.0029 | 0.0002 | −0.0000 |
| 0.125 | 0.7571 | 0.0380 | −0.0007 | 0.0000 | −0.0000 |
| 0.000 | 0.7579 | 0.0000 | −0.0000 | 0.0000 | −0.0000 |

From the above Table it can be seen that when the input amplitude be 1.000, the amplitude of the 2nd harmonic output amounts to 0.0971 which is 25% of that of the fundamental output, namely 0.3883. The 3rd harmonic is about 12% and the 4th harmonic is about 7%.

The extent to which aliasing might arise from the various components depends on the input frequency. If this be very low, then all the significant harmonics will be below the Nyquist frequency but, as the input frequency rises, progressively more of the components will approach, and exceed, half the sampling frequency. As an example, if the input frequency be 0.24 of the sampling frequency the 2nd, 3rd and 4th harmonics will be at 0.48, 0.72 and 0.96 of the sampling frequency. The potentially troublesome alias frequencies from them will be at 0.52, 0.28 and 0.04 of the sampling frequency, (i.e. the complement with respect to one). The normal filter following the digital-to-analogue converter should have sufficient rejection above half the sampling frequency, so that the component at 0.52 should not be too much of a problem. However, the same filter will have a negligible effect at 0.28 and 0.04 of the sampling frequency, corresponding to aliases produced by the 3rd and 4th harmonics arising in the gamma correction operation.

Probably the simplest situation to consider is where the wanted and the alias frequencies are similar and the worst of these cases is when the alias arises from the 2nd harmonic. For an input frequency at 0.33 of the sampling frequency (fs), the 2nd harmonic will be at 0.66 fs, resulting in an alias frequency of 0.34 fs. There will also be an alias at a frequency at 0.01 fs arising from the 3rd harmonic but at this stage it will be ignored.

For this input frequency, if the input amplitude be 1.000 p-p, the peak value of the largest unwanted alias component amounts to 25% of the peak value of the wanted fundamental signal. The unwanted signal is only 12 dB down on the wanted signal and this is not sufficient to prevent it being disturbing.

One solution would be to increase the sampling frequency, for example, to double it for the gamma correction operation, but this increases the complexity of the circuit and the bandwidth requirements. Also it does not remove the problem with higher-order harmonics, e.g. the third.

SUMMARY OF THE INVENTION

The invention is defined in the appended claims to which reference should now be made.

As described below with reference to a specific embodiment of the invention, unwanted alias components introduced into a digital video signal such as by a gamma corrector are made less noticeable by artifically reducing the amplitude of high frequencies entering the gamma corrector, and compensating, at least for small signals, for the effect on the overall frequency response after the gamma corrector. The attenuation is effective for frequencies approaching or exceeding one third of the sampling frequency.

Referring to Table 1, if the input amplitude be reduced to 0.500 it can be calculated that the 2nd harmonic is now only 8% of the fundamental, or about 22 dB down. Moreover, the 3rd harmonic is further reduced to 1.1%, or 39 dB down, which may be ignored.

The frequency response has to be corrected or equalised after the gamma correction, which restores the fundamental to the correct amplitude. If the alias frequency is comparable to the signal frequency then the alias amplitude will be changed similarly, so the ratio of wanted to unwanted signal amplitudes, by this frequency compensation, remains equally improved.

However, the reduction of the amplitude of high frequencies is only needed for those frequencies which may lead to alias problems from harmonics arising in the gamma correction. The 2nd harmonic is no longer a problem when the fundamental frequency drops below about 0.25 fs and the 3rd is irrelevant below about 0.17 fs (i.e. fs/6). So although 6 dB or more reduction may be required for frequencies above about 0.25 fs, only about 2 dB is needed down to 0.17 fs and below that frequency essentially none is needed. Normally, pictures which have a very high depth of modulation of high frequencies, do not frequently occur, but they do occur at times in natural pictures, and certainly they typically occur in pictures used for equipment assessment. It is important therefore that any all as components should not be obtrusive.

This implies that the necessary attenuation has a frequency response with sharp steps. However, this ignores the fact that the visibility of an alias decreases with increasing alias frequency, which makes the minimum necessary attenuation a much smoother curve. If the alias frequency is at a frequency where the gain of the frequency compensation following the gamma correction is less than the gain for the fundamental frequency then an additional suppression of the alias component obtains. This is more likely to be significant where the 2nd harmonic is the source of the aliasing.

BRIEF DESCRIPTION OF THE DRAWINGS

The invention will now be described in more detail, by way of example, with reference to the accompanying drawings, in which:

FIG. 3 (referred to above) is an illustrative diagram showing a re-arrangement of the circuit of FIG. 2;

FIG. 4 is a block circuit diagram of a television system using a digital gamma corrector and having frequency response modifier and equaliser circuits in accordance with this invention;

FIG. 7 is a block diagram of a more complex transversal filter for use as an alternative modifier circuit;

FIG. 8 is a block diagram of a more complex transversal filter for use as the corresponding alternative equaliser circuit;

DETAILED DESCRIPTION OF A PREFERRED EMBODIMENT OF THE INVENTION

Figure 1:
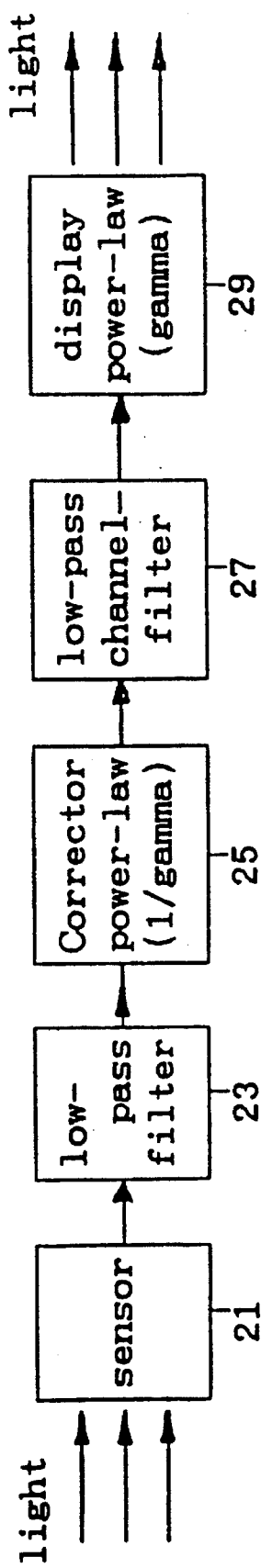
FIG. 1 (referred to above) is a block diagram of certain components of a normal analogue television system.
Figure 2:
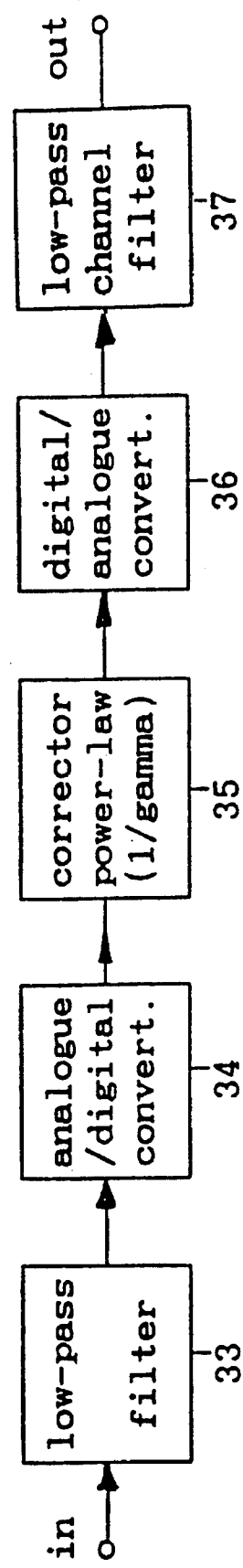
FIG. 2 (referred to above) is a block diagram of part of the system of FIG. 1 showing the inclusion to analague-to-digital and digital-to-analogue converters.

FIG. 4 shows a television system embodying the invention, and comprising a light sensor device 21 for generating a video signal from incident light, a low-pass filter 33 connected to the output of the sensor 21, and an analogue-to-digital converter 34 connected to the output of the filter 33. A frequency response circuit 50 is connected to receive the output of the analogue-to-digital converter 34 and, in accordance with this invention, reduces the amplitude of the high-frequency video components. The output of the modifier can then be applied to a gamma connector 35, where it suffers non-linear processing in accordance with a smoothly varying power law, as is well known. The gamma-corrected signal is applied to a non-linear equaliser circuit 52 which is complementary to the modifier 50 and restores the overall frequency response. The signal is then convened to analogue form by a digital-to-analogue converter 36, and applied through a low-pass channel filter 37 to a display 29 of the type exhibiting a gamma law, e.g. comprising a cathode ray tube. This gamma law will however have been compensated for by the action of the gamma corrector 35.

The production of unwanted alias components (corresponding to spectral reflection mirrored in the sampling frequency) is reduced by modifying the frequency response of the signal applied to the gamma corrector. The modification involves reducing the amplitude of the high frequency components prior to the gamma corrector, and correspondingly reinstating the overall frequency response thereafter.

Conventional pre-emphasis and de-emphasis networks that are used with frequency modulation have significant but complementary group delay errors. In comparison the pre-ferred embodiment uses a pre-gamma filter with zero or negligible group delay error. Since the equaliser has complementary characteristics it will likewise have a zero or negligible group delay error. Furthermore, the pre-gamma filter has a decreasing gain with increasing frequency, whereas conventional pre-emphasis provides a gain which increases with increasing frequency.

In FIG. 4 the modifier 50 and equaliser 52 are shown as operating in the digital domain. They could alternatively be placed, respectively, before the A/D converter 34 and after the D/A converter 36, and then operate in the analogue domain.

Figure 5:
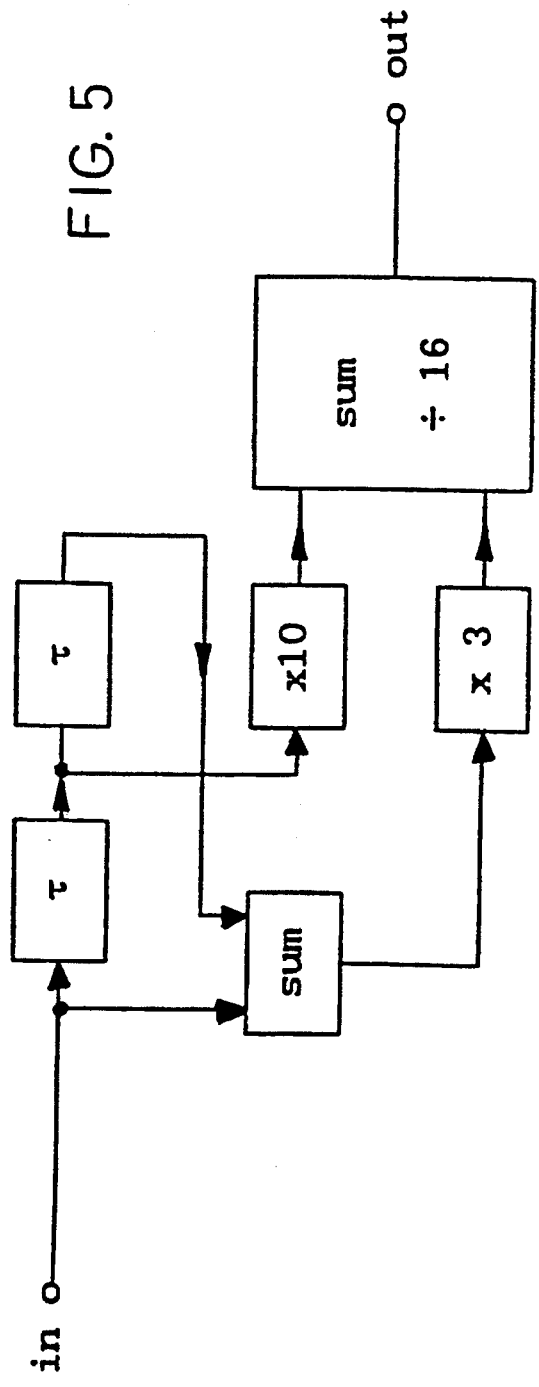
FIG. 5 is a block diagram of a simple transversal filter for use as the modifier circuit of FIG. 4.

FIG. 5 shows a simple, 3 tap, symmetrical transversal filter which provides the essential characteristics defined above for the modifier filter 50 to precede the gamma corrector. Each box containing the symbol "τ" (the Greek letter tau), represents a set of latches to provide a digital delay of one sample period. The two delayed signals and the undelayed signal are multiplied by 10 and by 3 as shown in the figure. The larger box "sum" is also a satisfactory place to neutralise the low frequency gain of 16, by shifting the bits at the output, 4 places to lower significance. This effects division by 16. With the coefficients, 3, 10, and 3, that are shown, the variation of gain with frequency is as follows:

| Frequency | Gain |
|---|---|
| low | 1.000 |
| fs/4 | 0.625 |
| fs/2 | 0.250 |

If the number of bits used for the input and output words be the same then, since the gain at the highest frequency is only a quarter, signals at this frequency will be reduced to occupy a range of digital quanta levels at the output, which is only one quarter of that which they would have occupied, at the input. Since this reduction will be compensated after the non-linear operation, this will have the effect of increasing quantisation noise. However, the eye is more tolerant to quantisation noise at higher frequencies, so this increase, approaching 4:1, is acceptable, although not desirable.

Figure 6:
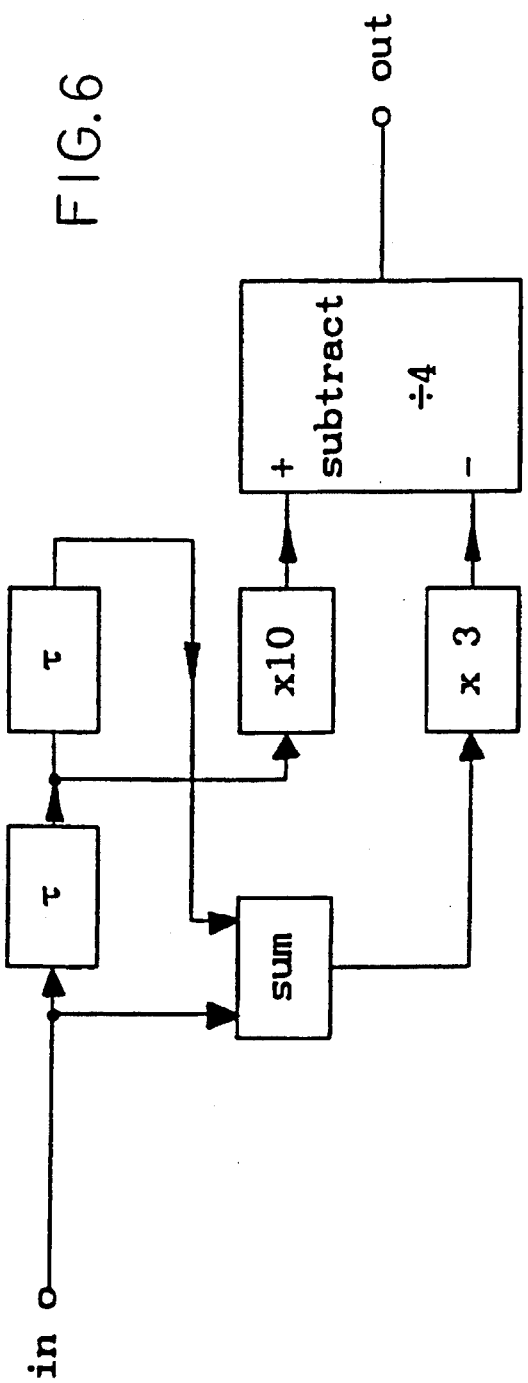
FIG. 6 is a block diagram of a simple transversal filter for use as the corresponding equaliser circuit in FIG. 4.

FIG. 6 shows a simple 3 tap transversal filter, with coefficients −3, 10, −3 which provides a gain of 4 at half the sampling frequency, which can be used as the equaliser 52 after the gamma corrector 35 to provide a measure of equalisation for the pre-gamma modifier filter 50. The block diagram is almost identical to FIG. 5 except that the larger block has been changed from add to subtract and that a shift to lower significance of only 2 bits is used, so as to divide by four. The variation of gain with frequency is:

| Frequency | Gain |
|---|---|
| low | 1.000 |
| fs/4 | 2.500 |
| fs/2 | 4.000 |

Although the equalisation makes the combined modifier and equaliser both at low frequency and at high frequency (fs/2) equal to 1, the combined gain at fs/4 is equal to 1.5625, which is excessive and will need to be further compensated.

The nomenclature of a more complex modifier filter and equaliser, appearing in FIGS. 7 and 8 respectively, are essentially the same as the simpler filter and equaliser of FIGS. 5 and 6, respectively. As transversal filter construction is well known, and the construction of the illustrated figures is clear from the drawings, a detailed description is not given here. The variation of gain with frequency is as follows:

| Frequency | Modifier Gain (FIG. 7) | Equaliser Gain (FIG. 8) |
|---|---|---|
| low | 1.000 | 1.000 |
| fs/4 | 0.500 | 2.000 |
| fs/2 | 0.250 | 4.000 |

The product of the simpler, 3 10 3 filter and −3 10 −3 equaliser of FIGS. 5 and 6, yields an overall time domain response of −9 0 82 0 −9, which gives a cosinusoidal frequency response with a maximum of 1.5625 at fs/4 and minima of 1.000 at 0 and fs/2. The product of the more complex filter 16 18 6 1 and the 1 −6 18 −6 1 equaliser, yields an overall time domain response of 10 0 0 254 0 0 0 1 which again gives a cosinusoidal frequency response but with maxima of 1.000 at 0, fs/4 and fs/2 and minima of 0.984 midway between successive maxima. This combination provides a much better overall frequency response as well as a somewhat larger reduction of the amplitude of components entering the gamma corrector at frequencies in the region of fs/4. The frequency responses are normalised to have a gain of 1 at zero frequency.

In designing the transversal filters of FIGS. 5 to 8, it is preferred that the effective sum of the filter coefficients, taking account of sign, should in each case be a power of two. The sums of the coefficients of FIGS. 5 to 8 are seen to be 16, 4, 32 and 8, respectively. The coefficients are symmetrical about the centre term. It is also desired to keep the number of terms down to a reasonably small value to avoid undue complexity of the circuitry.

It should be realised that the methods described above for the reduction of aliasing, as a result of non-linear processing of signals that have been sampled in the process of converting to a digital form, are equally applicable to the similar problem which arises due to the inherent sampling of the television line structure. This can be most clearly considered for progressively scanned (non-interlaced) sources, such as a telecine. The previous block diagrams are equally relevant, providing the boxes labelled "τ", which previously indicated a delay equal to the spacing between samples in the horizontal direction, are now interpreted as meaning a delay equal to the spacing between samples but in the vertical direction, that is a line delay.

These two processing directions can furthermore be combined, by passing the input through a horizontal pre-filter and a vertical pre-filter prior to gamma correction. After gamma correction the resulting signal is passed through both horizontal and vertical equalisers. However, care is needed with this approach as can be seen by considering the filtering that occurs for diagonal frequencies. At diagonal frequencies where the horizontal and vertical frequencies are both high, such as fs/2, if the gain of the individual horizontal and vertical filters at this frequency be a quarter of the low frequency value, then the gain for a diagonal frequency will be only one sixteenth. This is so small that it must be expected to result in quantisation noise problems.

The solution to this problem is to use two-dimensional filtering with a lower attenuation for high diagonal frequencies. This can be achieved either by having cascaded horizontal and vertical filters each of which has a gain of about 0.5 from fs/4 to fs/2, or by using two-dimensional filters. Two-dimensional filters are of two types, separable and non-separable. The separable type is one that can be factorised into two separate filters, for example horizontal and vertical; this would suffer the same limitations as just noted. The desired characteristic for this application is that a high diagonal frequency should experience about the same attenuation as a high horizontal or vertical frequency. This requires the use of non-separable filters.

Figure 9:
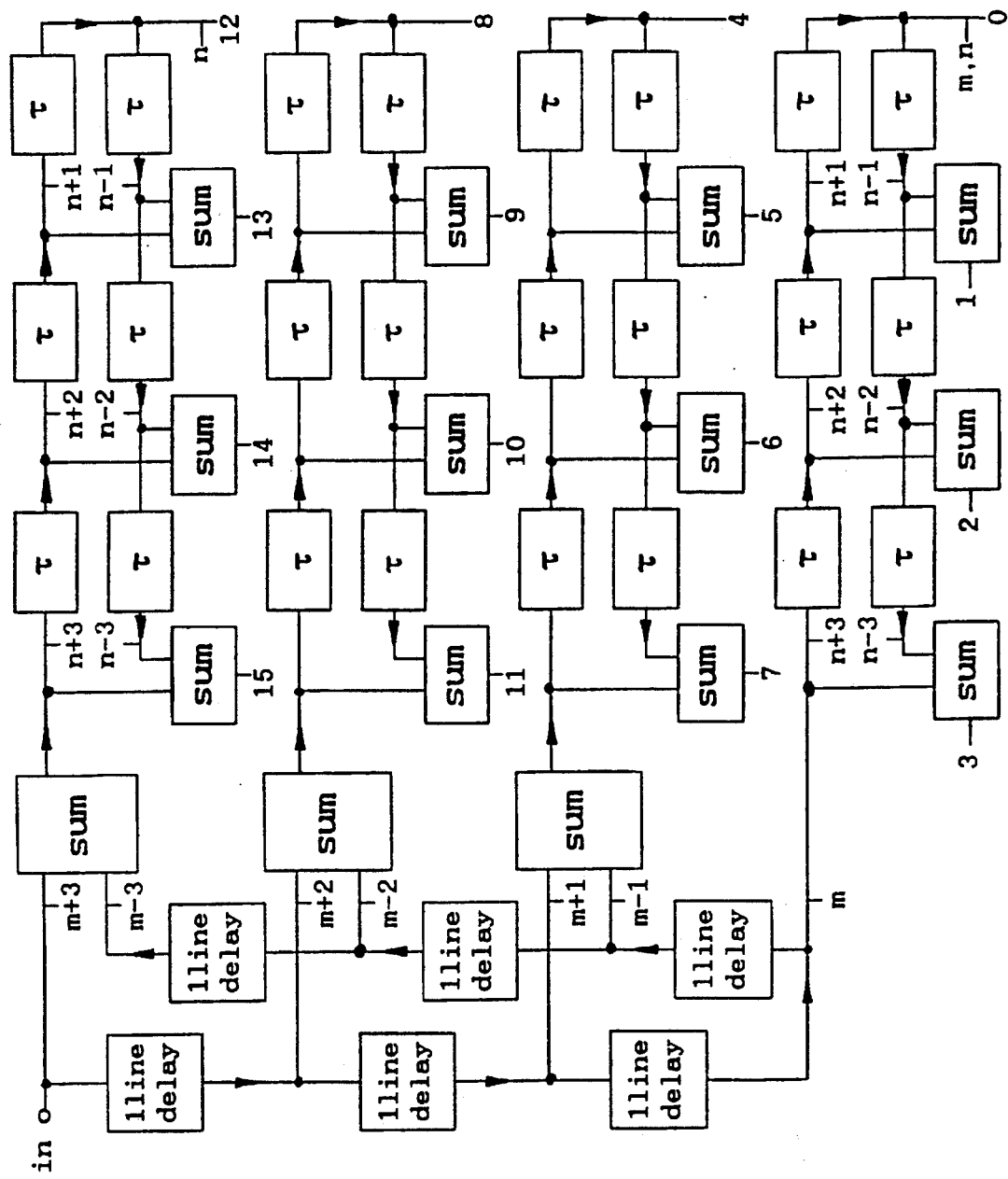
FIG. 9 is a block diagram of part of a two-dimensional (horizontal-vertical) transversal filter for use as the modifier or equaliser circuit.
Figure 10:
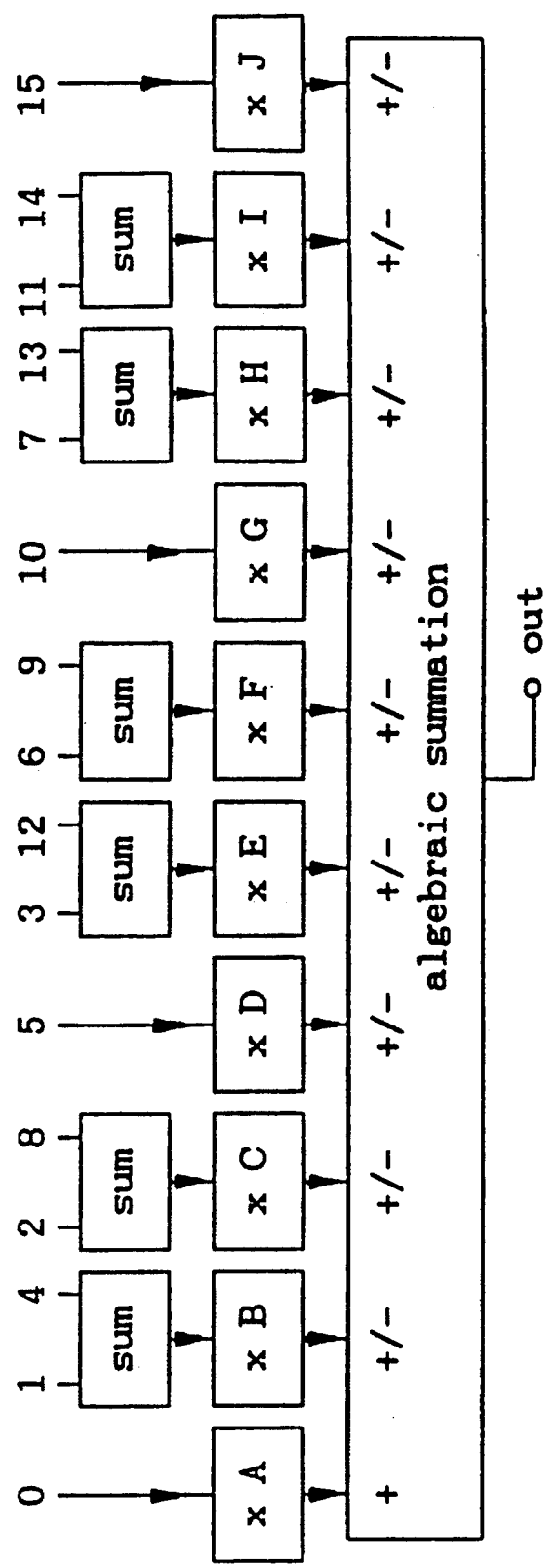
FIG. 10 is a block diagram of the rest of the two-dimensional transversal filter showing the combining circuitry.
Figure 11:
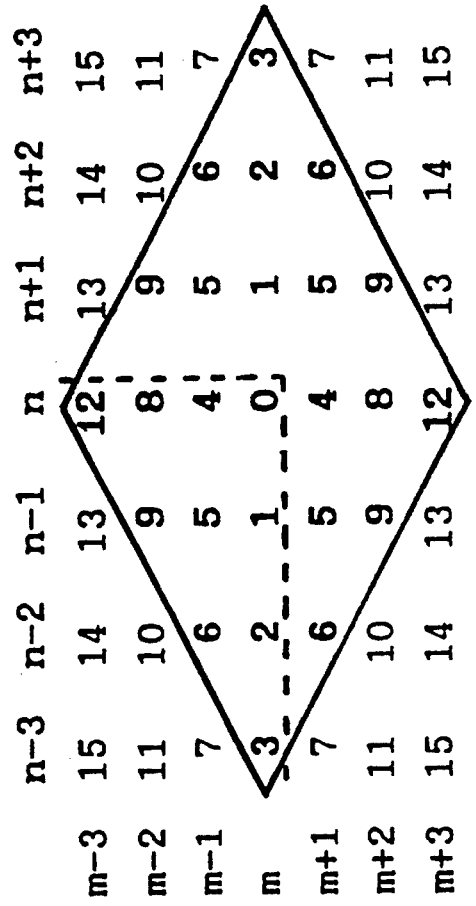
FIG. 11 is a table showing the two-dimensional relationship of the delay outputs of the circuit of FIG. 9.

The 2-dimensional filter should be symmetrical both horizontally and vertically, so mirroring techniques can be used to reduce the complexity. FIG. 9 shows how this may be achieved. For the signal at the "n"th sampling position on the "m"th line, FIG. 9 shows a block diagram of how the 49 signals in the block from m±3, n±3 may be combined into 16 paths labelled 0 to 5. FIG. 11 shows, in very concise form, the path that is used for each of 49 signals making up the m±3, n±3 block. Each of the sixteen paths 0 to 15 are then multiplied by an appropriate coefficient. This is illustrated in FIG. 10. Again, the detailed construction of transversal filters is well known and the construction of the illustrated figures is perfectly clear to those skilled man in the arc from inspection of FIGS. 9 and 10.

The sixteen coefficients are contained in one-quarter of FIG. 11, as shown by the dashed line, due to the horizontal and vertical mirror symmetry. The filtering in the horizontal and vertical directions can be different. However, there is every reason to make them the same. This is used beneficially in FIG. 10 to reduce these 16 paths to 10 by summing appropriate paths before the multipliers ×A to ×J inclusive.

A possible set of multiplying coefficients for the pre-gamma filter is as follows:

| | |
|---|---|
| A = 492 | B = 70 |
| C = 13 | D = 38 |
| E = 4 | F = 4 |
| G = 0 | H = 0 |
| I = 0 | J = 0 |

Precisely the same type of system can be used for the post-gamma equaliser except that the coefficients are then as follows:

| | |
|---|---|
| A = 1144 | B = −112 |
| C = −6 | D = −55 |
| E = −7 | F = 11 |
| G = 0 | H = 0 |
| I = 0 | J = 0 |

The output is normalised by division by the effective sum of the coefficients, as with the filters of FIGS. 5 to 8. With these coefficients the whole of the rectangular 7 by 7 block is not used. The area being used is diamond shaped, of maximum width and height equal to 7, as shown by the diamond-shaped box in FIG. 11. In such a case the paths 7, 10, 11, 13, 14 and 15 are all unused and significant savings can be made by omitting those parts in FIGS. 9 and 10 which are relevant only to these paths. It may well be possible to produce effective filters in which the weighting coefficients are rather smaller than the quite large values used in FIG. 10. Again it is preferred that the coefficients used should add up to a power of two, due account being taken of their sign and the fact that some of the coefficients are used multiple times.

For the coefficients given the response for horizontal and vertical frequencies is 0.60 at fs/4 and 0.38 at fs/2. For diagonal frequencies the response is 0.42 at fs/4 and 0.35 at fs/2.

In any given system the degree of high frequency attenuation will need to be evaluated empirically to provide optimum results. In the illustrated examples the amount of HF attenuation has been restricted. It was felt that the attenuation at fs/4 should be about 6 dB (one-quarter), and that it should not be much higher than that at frequencies up to fs/2. In practice more can be tolerated and the one-dimensional filters described give 12 dB (one-sixteenth) at fs/2.

Strictly speaking, the reinstatement of the frequency spectrum by the equalisers described is only accurate for low-level signals. The equalisation is not therefore complete but is sufficient to provide a significant overall subjective picture improvement. In practice the equalisers may not need to have an exactly complementary frequency response to the modifiers. For instance it may not be necessary to take the complementary frequency response right up to half the sampling frequency, but it may be sufficient to go up to 0.8 of the Nyquist limit (0.4 fs). It should be substantially complementary in the region which is found in practice to be of importance. Furthermore the restoration or equalisation function may be combined with signal processing for other purposes so that it is not separately identifiable but is incorporated as a contribution to an overall processing function.

The above description has been given initially in terms of gamma correction circuitry and extended to horizontal, vertical and to two-dimensional (horizontal and Vertical) video processing generally. It will thus be appreciated that the invention is applicable quite generally in the field of video signal processing, wherever a non-linear but smooth transfer function is being applied to a signal.

Other situations in which the system might be particularly applicable include the following:

in a telecine, in the one- or two-dimensional form in any digital camera in the one-dimensional form in digital cameras with progressive scan, in the two-dimensional form in a receiver, with gamma correction circuitry with the gamma corrector of a separate luminance channel, in a system where R, G and B are added together to give the luminance Y before a "gamma-like" correction in a corresponding receiver where the received luminance is raised to the power gamma, and then matrixed with R-Y and B-Y to give R, G and B signals which need gamma correction in line-rate up-conversion, in two-dimensional form in standards conversion generally.

In the illustrated embodiments the detailed circuit components are shown separately to explain their functions, but in practice many of the circuit elements may be combined, or they may be rearranged to provide the same function. Indeed it may be possible to implement certain of the functions in software, in which case the figures should be regarded as in the nature of flow charts, in which respect they are equally applicable.

Other modifications within the scope of the appended claims will be apparent to those skilled in the art.

I claim:

1. A method of reducing the production of alias components arising in a video signal due to a digital gamma correction operation; the method comprising the steps of:

receiving a video input signal in baseband form, the input video signal being in the form of a red, green, blue or monochrome signal;

filtering the video input signal with a fixed filter function to modify the frequency spectrum by relatively attenuating high frequency signals at frequencies approaching or exceeding one-third of the sampling frequency and up to one-half of the sampling frequency fs, to provide a filtered signal;

subjecting the filtered signal to a digital gamma correction operation, to provide a gamma-corrected signal; and compensating the overall frequency response of the gamma-corrected signal for said relative attenuation.

2. A method according to claim 1, in which the filtering is in the direction which corresponds to horizontal image resolution.

3. A method according to claim 1, in which the filtering is in the direction which corresponds to vertical image resolution and the sampling frequency is the line frequency.

4. A method according to claim 1, in which the filtering is in the directions which correspond to both horizontal and vertical image resolution.

5. A method according to claim 4, in which the filtering step provides a filtering function for the diagonal frequency response which is not the product of filtering functions for the horizontal and vertical frequency responses.

6. A method according to claim 1, in which the filtering and the compensating operations take place with the digitally sampled signals.

7. A method according to claim 1, in which attenuation is applied to input signals in the frequency range from fs/4 to fs/2.

8. A method according to claim 1, in which said relative attenuation applied to said video signal increases with increasing signal frequency.

9. Video signal processing apparatus for reducing the production of alias components arising in a video signal due to a digital gamma correction operation; the apparatus comprising:

an input for receiving a video input signal in baseband form, the input video signal being in the form of an a red, green, blue or monochrome signal;

filtering means coupled so the input for filtering the video signal with a fixed filter function to modify the frequency spectrum by relatively attenuating high frequency signals at frequencies approaching or exceeding one third of the sampling frequency and up to one-half of the sampling frequency fs, to provide a filtered signal, a gamma corrector coupled to the filtering means for subjecting the filtered signal to a digital gamma correction operation, to provide a gamma-corrected signal; and equalising means coupled to the output of the gamma corrector for compensating the overall frequency response of the gamma-corrected signal for said relative attenuation.

10. Apparatus according to claim 9, in which the filtering means and equalising means each comprise transversal filter means.

11. Apparatus according to claim 10, in which the transversal filter means is a one-dimensional transversal filter means.

12. Apparatus according to claim 11, in which the delays in the transversal filter means are related to the time between successive picture samples.

13. Apparatus according to claim 11, in which the delays in the transversal filter means are related to the time between successive picture lines.

14. Apparatus according to claim 10, in which the transversal filter means is a two-dimensional transversal filter means.

15. Apparatus according to claim 14, in which the two-dimensional filter function is non-separable into horizontal and vertical functions.

16. Apparatus according to claim 10, in which the transversal filter means have weighting coefficients which add up to powers of two, account being taken of sign, and which are symmetrical about the centre term.

17. Apparatus according to claim 9, in which the modifying means and equalising means operate on digitally-sampled signals.

18. Apparatus according to claim 9, in which attenuation is applied to input signals in the frequency range from fs/4 to fs/2.

19. Apparatus according to claim 9, in which the attenuation increases with increasing frequency.

20. Apparatus according to claim 9, in which the input receives progressively scanned video signals.

* * * * *